United States Patent [15] 3,650,430
Siegmar et al. [45] Mar. 21, 1972

[54] HOLDER FOR MASS-PRODUCED MINIATURE ELECTRICAL COMPONENTS, ESPECIALLY SEMICONDUCTOR MEMBERS

[72] Inventors: Wolfgang Siegmar; Hans Wissinger, both of Regensburg, Germany

[73] Assignee: Siemens Aktiengesellschaft, Berlin and Munich, Germany

[22] Filed: Aug. 27, 1969

[21] Appl. No.: 853,360

[30] Foreign Application Priority Data

Sept. 3, 1968 Germany ......................P 17 64 913.7

[52] U.S. Cl. ........................220/23.8, 206/56 AC, 220/31 S, 229/2.5

[51] Int. Cl. ....................................B65d 73/02, B65d 75/22

[58] Field of Search ............220/23.8, 31 S; 206/56 R, 56 A, 206/56 AC; 229/2.5

[56] References Cited

UNITED STATES PATENTS

| | | | |
|---|---|---|---|
| 3,311,229 | 3/1967 | Troll | 206/56 AB |
| 3,415,361 | 12/1968 | Adams | 206/56 R |
| 3,356,277 | 12/1967 | Hohnjec | 229/2.5 |
| 3,511,433 | 5/1970 | Andrews | 220/31 S X |
| 3,342,397 | 9/1967 | Duitsman | 229/2.5 |

FOREIGN PATENTS OR APPLICATIONS

| | | | |
|---|---|---|---|
| 251,558 | 10/1947 | Switzerland | 206/56 AB |
| 6,703,103 | 12/1967 | Netherlands | 229/2.5 |

*Primary Examiner*—George E. Lowrance
*Attorney*—Curt M. Avery, Arthur E. Wilfond, Herbert L. Lerner and Daniel J. Tick

[57] ABSTRACT

Holder device for mass-produced miniature electrical components includes at least two profiled bands of elastic plastic material disposed substantially parallel to one another, one of the bands being formed with at least one recess for receiving a respective electrical component therein, both of the bands having at least one row of pushbutton-like hollow projections, the hollow projections of one of the bands being inserted in respective ones of the other of the bands so as to hold the bands so tightly together that the component received in the recess is held firmly therein by both of the bands.

5 Claims, 5 Drawing Figures

HOLDER FOR MASS-PRODUCED MINIATURE ELECTRICAL COMPONENTS, ESPECIALLY SEMICONDUCTOR MEMBERS

SPECIFICATION

Our invention relates to holder device for mass-produced miniature electrical components, especially semiconductor members.

In order to protect electrical components, such as transistors or semiconductor diodes especially, from undesired external influences, it is customary to place these members in housings. It is also known to combine several elements, if necessary in individual housings, by embedding the same in common plastic envelopes.

It is accordingly an object of our invention to provide holder device for mass-produced miniature electrical components from which the components can be released and into which they can be reinserted at will or can be replaced by new components of the same type without having to damage the holder device.

It is a further object of our invention to provide holder device wherein these electrical components can be mechanically packaged in a relatively simple manner.

In identifying by silkscreen printing methods miniature components, such as transistors or semiconductor diodes disposed in housings, it is desirable for economic reasons that a multiplicity of such members be imprinted. A basic requirement therefor is to arrange the components so that their spacing and positions are accurately defined and so that they are secured against falling out. It is furthermore necessary that, in the course of the printing operation, the doctor should not skip from part to part, but rather should produce through suitable means the impression of a uniform closed surface. It is also desirable to be able to stack the imprinted parts adjacent to but free of engagement with one another. It is accordingly an additional object of our invention to provide holder device which will securely hold the electrical components in accurately defined spacing and positions, permit the doctor to produce an impression of a uniform closed surface, and permits the stacking of the imprinted parts adjacent to but not in contact with one another.

With the foregoing and other objects in view, we provide holder for mass-produceed miniature electrical components, especially semiconductor members, comprising at least two profiled bands of elastic plastic material disposed substantially parallel to one another, one of the bands being formed with at least one recess for receiving a respective electrical component therein, both of the bands having at least one row of pushbutton-like hollow projections, the hollow projections of one of the bands being inserted in respective ones of the other of the bands so as to hold the bands so tightly together that, the component received in the recess is held firmly therein by both of the bands.

In accordance with further features of our invention, the bands are formed of deep-drawn polystyrene, and particularly having a wall thickness of 0.3 mm. This plastic material fully satisfies the requirements as to elasticity. The hardness of the respective plastic materials is controlled in order to provide the required elastic characteristics desirable for the pushbutton-like locking action. The upper and lower band parts are completely detachable from one another. Alternatively thereto, the upper and lower band parts are connected with a strip of a thinner or softer and therefore flexible material. Also in this case, both band parts are fixed to one another, by means of the row of pushbutton-like locks, into the required position for holding the electrical components. The individual "pushbuttons"of the locking device are preferably disposed very close to one another so as to act somewhat like a zipper fastener.

Other features which are considered as characteristic for the invention are set forth in the appended claims.

Although the invention is illustrated and described herein as embodied in holder for mass-produced miniature electrical components, especially semiconductor members, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
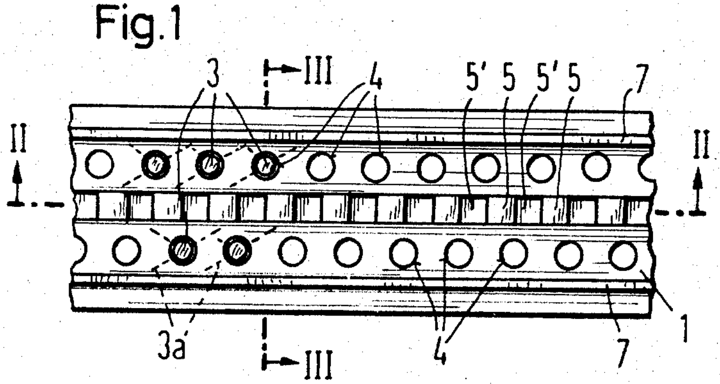
FIG. 1 is a top plan view of part of an embodiment of the holder device of our invention.
Figure 2:
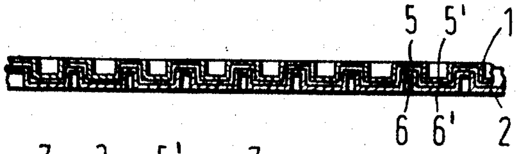
FIG. 2 is a longitudinal sectional view of FIG. 1 taken along the line II—II in the direction of the arrows.
Figure 3:
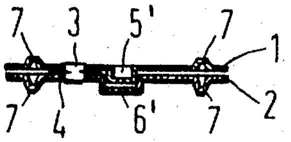
FIG. 3 is a cross sectional view of FIG. 1 taken along the line III—III in the direction of the arrows.

Referring now to the drawing and first particularly to FIGS. 1 to 3 thereof, there is shown a holder device constructed in accordance with our invention which is formed of two bands 1 and 2 of plastic material, such as a polystyrene, for holding electrical components 3, the two bands 1 and 2 being non-integral and fully separable from one another. Only a single row of pushbutton-like fastening projections 5,5′ is provided in each of the two bands 1 and 2, and is disposed along the longitudinal center line II—II of the holder device as seen in FIG. 1. The pushbutton-like projections 5 and 5′ which are fitted into one another extend alternately from both sides of the plane in which the plastic bands 1 and 2 are disposed i.e., the plane perpendicular to the drawing in FIG. 2. The projections 5 and 5′, as shown in FIG. 2, are disposed so closely behind one another so as to produce a substantially sinusoidal or square wave profile along the center line II—II of the holder device. The locked projections 5 and 5′ (FIG. 2) form a structure comparable to a type of zipper fastener. On both sides of the center line II—II, hole-like recesses 4 are formed in both bands 1 and 2. The recesses 4 can be somewhat smaller in diameter than the largest diameter of the disc-shaped components 3, in which case the components 3 are retained between the bands 1 and 2 by the material thereof located at the marginal edges defining the respective recesses 4. The electrical leads 3*a* of the components 3 serve as auxiliary means for and can serve as the sole means for retaining the components 3 in the holder device of our invention. The location of the holes 4 are selected so that mutually corresponding holes 4 of the upper and lower bands 1 ad 2 as viewed in FIG. 3, are exactly superimposed or in registry when both band parts 1 and 2 are fastened to one another by means of the zipper-like row of "pushbuttons" 5 and 6 as well as 5′ and 6′. The flat sides of the introduced wafer-like components 3 having a slightly larger diameter than that of the holes 4 are then exposed and can be conveniently subjected to a silkscreen printing process. On the other hand, because of the somewhat greater diameter of the components 3 as compared to that of the holes 4, the components 3 cannot slip out of the holder device. Longitudinally extending guide rails 7 are provided moreover on both bands 1 and 2 on opposite sides of both rows of the holes 4.

Both the upper and lower band parts 1 and 2 have the same dimensions and are formed of deep-drawn polystyrene or similar elastic synthetic material. When the band parts 1 and 2 are attached by the pushbutton-like projections 5,6 and 5′, 6′ thereof, the electrical components 3 are held tightly between the band parts 1 and 2 at the holes 4 formed in the latter so that they cannot move. This is achieved most reliably by the close zipper-like arrangement of the projections 5,6 and 5′, 6′ as shown in FIGS. 1 and 2. The rails 7 located at both sides of the bands 1 and 2 can serve as guide for mechanically inserting the electrical components 3 into the holder device. If desired, the profile of the bands 1 and 2 can be provided with other details for effecting a reliable hold on the components 3. For the purpose of mechanically mounting the electrical components 3 in the holder device of the invention, one of the two band parts 1 and 2, which have the same thickness in the embodiment of FIGS. 1 to 3, can be used as a support plate which is automatically studded with the components 3 in the required positions above the holes 4 formed in the respective band part. The other band part is then pressed into the required position thereof superimposed on the support plate, with the respective holes 4 in both band parts 1 and 2 and the respective components 3 being in registry with one another, as shown in FIG. 3. The freely exposed flat sides of the components 3 can then be stamped by a silkscreen printing method.

Figure 4:
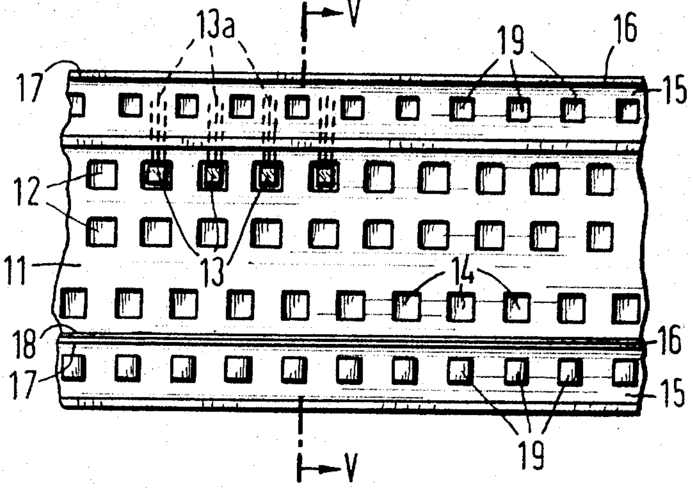
FIG. 4 is a top plan view of part of another embodiment of FIG. 1.
Figure 5:
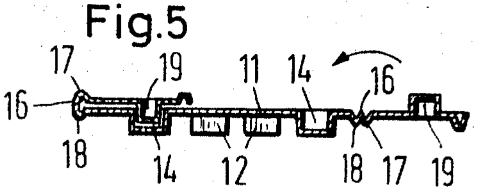
FIG. 5 is a cross sectional view of FIG. 4 taken along the line V—V in the direction of the arrows.

The embodiment of the holder device of our invention shown in FIGS. 4 and 5 has a lower band part 11, as shown in FIG. 5, formed with two rows of hole-like recesses or indentations 12 which serve to receive electrical components 13 (of rectangular shape in the embodiment of FIGS. 4 and 5), whose size corresponds thereto. The two rows of holes 12, which conform to the size and shape of the components 13 being received therein, are located directly adjacent the longitudinal center line of the lower band part 11, as seen in FIG. 5. On both sides of the double row of holes 12 there are disposed, respectively, a row of pushbutton-like projections 14 which serves to attach the lower band part 11 to be respective upper band part 15. The upper band part 15 respectively covers only a marginal strip of the lower band part 11 and is, moreover, integrally connected to the latter by a hinge-like connecting part 16 consisting of the same material as that of the band parts 11 and 15. The flexibility of connecting part 16, in spite of the fact that it is of the same thickness as that of the band parts 1 and 2, is effected by providing two longitudinal corrugations or ceases 17 and 18 therein. In this way, it is possible to hingedly raise and lower the upper band parts 15. The electrical components 13 are held in the recesses 12 of the holder device of FIGS. 4 and 5 due to the fact that the electrical leads **13*a* extending substantially parallel to one another from the components 13 are clamped between the respective upper and lower band parts 15 and 11 when the parts 11 and 15 are locked to one another. As seen in FIG. 5, congruent recesses 19 are formed in the upper band parts 15 and correspond to the recesses 12 formed in the lower band part 11. When the respective upper band part 15 has been folded down onto the band part 11, as shown at the left-hand side of FIG. 5, so that the respective pushbutton projection 14 of the upper band part 15 fits snugly into the recess formed in the corresponding pushbutton projection 14 of the lower band part 11, the thus-folded upper band part 15 and the electrical leads 13*a* of the component 13 are rigidly held in position. As can be readily seen in FIG. 5, the left-hand upper band part 15 is in folded condition wherein it lies above the left-hand marginal strip of the lower band part 11 while the right-hand upper band part 15 is in unfolded condition wherein it extends in the same plane as the lower band part 11. It is also noted that for the embodiment of FIGS. 4 and 5, the projections 14 and 19 effecting the pushbutton-like closure of the holder device are extended from only one side of the holder device when the upper band parts 15 are in their folded position; thus as viewed in FIG. 5, if the right-hand upper band part 15 were also in the same folded condition as the left-hand upper band part 15**, then the only pushbutton projections visible would be those located at the underside of the holder device.

The embodiment of FIGS. 4 and 5 combines the packing unit of the holder device into only one synthetic material part which, in a technologically simple manner can be produced by deep drawing. Moreover, with the embodiment of FIGS. 4 and 5, the mechanical mounting of electrical components therein is considerably facilitated.

We claim:

1. Holder device for mass-produced miniature electrical components of given geometric shape having leads extending therefrom comprising a profiled lower band and at least one profiled upper band, said bands being formed of plastic material and disposed substantially parallel to one another, one of said bands being formed with at least one recess of geometric shape for accommodating one of the electrical components therein with the leads of the component extending out of said recess, both of said bands having at least one row of equidistant pushbutton-like hollow projections, the hollow projections of one of said bands being insertable in respective ones of the other of said bands to form a row of equidistant locking elements, said locking elements being spaced so closely to one another that the leads of the electrical components are clamped between said bands with the electrical component held immovably within the recess, said recess being open so as to expose at least part of the surface of the electrical component received therein.

2. Holder device according to claim 1, wherein a plurality of recesses are formed in said one band for receiving a plurality of electrical components respectively therein, and including guide means carried by at least one of said bands for guiding mechanical means for mounting the electrical components in said recesses.

3. Holder device according to claim 1, wherein said hollow projections are located closely adjacent one another in said row thereof in each of said bands and, in condition wherein the hollow projections of one of said bands are inserted in the hollow projections of the other of said bands, said hollow projections extend in alternating opposite directions from a common plane wherein both said bands are disposed.

4. Holder device according to claim 1 wherein said row of locking elements extends in a chain along the longitudinal center of said bands, and a row of recesses for accommodating a plurality of the electrical components, respectively, is disposed parallel to said chain of locking elements, said recesses being open at the top thereof so as to freely expose the upper surface of the electrical components, the leads of the electrical components being clampable between said upper and lower bands for holding the electrical components firmly in the device.

5. Holder device according to claim 4, including a hinge-like part of plastic material connected along respective adjacent longitudinal edges of both of said bands so that said bands and said hinge-like part form an integral member.

* * * * *